(12) United States Patent
Conteras et al.

(10) Patent No.: US 7,061,706 B2
(45) Date of Patent: Jun. 13, 2006

(54) CIRCUITRY FOR LINEAR CONTROL OF HEAD FLYING HEIGHT USING THERMAL MEANS

(75) Inventors: John Thomas Conteras, Palo Alto, CA (US); Klaas Berend Klaassen, San Jose, CA (US); Jacobus Cornelis Leonardus van Peppen, San Jose, CA (US)

(73) Assignee: Hitachi Global Storage Technologies Netherlands B.V. (NL)

( * ) Notice: Subject to any disclaimer, the term of this patent is extended or adjusted under 35 U.S.C. 154(b) by 32 days.

(21) Appl. No.: 10/800,931

(22) Filed: Mar. 15, 2004

(65) Prior Publication Data

US 2005/0201001 A1 Sep. 15, 2005

(51) Int. Cl.
*G11B 5/60* (2006.01)
(52) U.S. Cl. ....................................................... 360/75
(58) Field of Classification Search .................. None
See application file for complete search history.

(56) References Cited

U.S. PATENT DOCUMENTS

| 6,195,219 B1 * | 2/2001 | Smith ........................... 360/66 |
| 2003/0039067 A1 | 2/2003 | Hsiao et al. |
| 2004/0114268 A1 * | 6/2004 | Satoh et al. .................. 360/75 |
| 2005/0024775 A1 * | 2/2005 | Kurita et al. ............. 360/234.3 |
| 2005/0105204 A1 * | 5/2005 | Bloodworth et al. ......... 360/75 |

OTHER PUBLICATIONS

K.B. Klaassen et al., "Nanosecond and Sub-nanosecond Writing Experiments," IEEE Transactions on Magnetics, vol. 35, No. 2, pp. 625-631, Mar. 1999.

\* cited by examiner

Primary Examiner—David Hudspeth
Assistant Examiner—James L Habermehl
(74) Attorney, Agent, or Firm—Duft Bornsen & Fishman, LLP

(57) ABSTRACT

The spacing decrease between pole tips of a write element and a magnetic medium that is associated with the write element is linearly proportional to an input signal, such as an input voltage or current, to a slider flying height controller for a hard disk drive. The flying height controller includes a heater current controller and a multiplexer. The heater current controller receives the input signal and outputs a control current proportional to the input signal. The multiplexer couples the control current to a heating element associated with the write element on a selected slider body during a read operation. The heating element dissipates a power that is proportional to the control current and causes a decrease in the spacing between the pole tips of the write element and the magnetic medium that is linearly proportional to the control current and to the input signal.

23 Claims, 9 Drawing Sheets

CIRCUITRY FOR LINEAR CONTROL OF HEAD FLYING HEIGHT USING THERMAL MEANS

BACKGROUND OF THE INVENTION

1. Field of the Invention

The present invention relates to Hard Disk Drives (HDDs). More particularly, the present invention relates to a technique for controlling the spacing between the pole tips of a write element and a magnetic medium (i.e., the flying height of a slider) of an HDD in a linear manner using a control signal.

2. Description of the Related Art

FIG. 1 shows an exemplary hard disk drive (HDD) 100 having a servo system for positioning a slider assembly 101 over a selected data information track on a magnetic disk 102 for writing data to and/or reading data from the selected track. The servo system of HDD 100 includes an actuator 104, such as a rotary voice-coil motor (VCM), for positioning an actuator arm 105, a read/write head suspension 106 and slider assembly 101 over a selected track. Slider assembly 101 includes a read/write head (not shown in FIG. 1) having a read element, such as a Giant Magnetoresistive (GMR) element, and a write element that respectively read data from and write data to a selected data track. While HDD 100 shows only a single magnetic disk 102, HDDs typically have a plurality of stacked, commonly rotated rigid magnetic disks and a corresponding number of actuator arms, read/write head suspensions and slider assemblies.

FIG. 2 depicts a cross-sectional side view of an exemplary read/write head 200 that is part of slider assembly 101. Read/write head 200 includes a thin film structure consisting of a stacked read element 201 and a write element 202 that are situated at the trailing edge of a slider body 203. Read element 201 is positioned in a read gap 204 between a bottom shield 205 and a bottom yoke/top shield 206. Write element 202 is formed by bottom yoke/top shield 206, top yoke 207, coil windings 208 of a write coil and write gap 209.

At the beginning of a write operation, write element 202 heats up due to power dissipation caused by a write current through the write coil of the write element and by the eddy current losses in bottom and top yokes 206 and 207 of write element 202. The warming causes pole tips 210 and 211 of write element 202 to protrude from the slider body. The pole-tip protrusion is proportional to the power dissipation in write element 202 and has a step response that is exponential as a function of time with a (thermal) time constant of several hundreds of microseconds. The clearance 212 between pole tips 210 and 211 and the magnetic recording medium 213, commonly referred to as the flying height of the slider, is reduced linearly as a function of the power dissipation. Accordingly, the write performance can change dramatically due to the change in effective flying height.

One conventional approach for decreasing the protrusion of the pole tips is by improving the heat sinking of the write coil, such as disclosed by U.S. Patent Application No. 2003/0039067 A1. Improving the heat sinking, however, becomes increasingly difficult as the dimensions of the write element decrease and as the data rate increases. Additionally, as the dimensions of the write element decrease, the area for the heat sinking also decreases. As the data rate increases and write current reversal times decrease, the power dissipation in the write element goes up due the increased eddy current losses in the yoke. See, for example, K. B. Klaassen et al., "Nanosecond and sub-nanosecond writing experiments," IEEE Transactions on Magnetics, Vol. 35, pp. 625–631, March 1999.

Another conventional approach for controlling the protrusion of the pole tips is to keep the protrusion of the write element unchanged going from a read to a write operation by keeping the temperature of the write element constant. A separate heater element 214 (FIG. 2) in the form of a resistive film has been provided with the write head and has been electrically excited with a voltage or current.

Yet another conventional approach for controlling pole-tip protrusion is to inject a "thermal protrusion control current" through a center-tap of the write-head coil. The current divides evenly between the two halves of the write-head coil and produces no net magnetic excitation of the write head yoke.

Nevertheless, what is needed is a technique for controlling pole-tip protrusion by controlling the spacing between the pole tips of a write element and the magnetic medium in a linear manner using a control signal.

BRIEF SUMMARY OF THE INVENTION

The present invention provides a technique for controlling pole-tip protrusion by controlling the spacing between the pole tips of a write element and the magnetic medium in a linear manner using a control signal.

The advantages of the present invention are provided by a slider flying-height controller that can be part of a read/write electronics module for a hard disk drive. The slider flying-height controller includes a heater current controller and a multiplexer. The heater current controller receives an input signal, such as an input voltage or an input current, and outputs a heater control current in response to the input signal. The input signal can be generated by, for example, a digital-to-analog converter based on selected data that has been input to the digital-to-analog converter. The multiplexer couples the heater control current to a heating element associated with a write element on a selected slider body of the hard disk drive when the hard disk drive is in a read operation. According to the present invention, the heating element dissipates a power that is proportional to the input signal and causes a spacing decrease between pole tips of the write element and a magnetic medium that is associated with the write element that is proportional to the input signal. In one embodiment of the present invention, the heater current controller includes a square-root circuit that receives the input signal as a current and outputs a first current that is proportional to the square root of the input current and the heater control current is proportional to the first current. In another embodiment of the present invention, the heater current controller includes a square-root circuit that receives the input signal as a current and outputs a first current that is proportional to the square root of the product of the input current and a second current having a predetermined magnitude.

In one embodiment of the present invention, the heater current controller further includes a current-pass element that is coupled to the first current and outputs the control current. A low-pass filter can be coupled to the output of the heater current controller for reducing high frequency disturbances in the output of the heater current controller. In an alternative embodiment of the present invention, the heater current controller further includes a current-to-voltage converter that receives the first current and produces a voltage that is coupled to the current-pass element, and the control current that is output from the current-pass element generates a voltage across the heater element that is proportional to the first current. The current-to-voltage converter includes a resistor through which the first current passes and generates a first voltage, and an operational transconductance amplifier that receives the first voltage and outputs a third current that drives the current-pass element. The current-to-voltage converter can include a filter coupled to the output of the operational transconductance amplifier that reduces high frequency disturbances in the output of the operational transconductance amplifier.

The present invention can also include a common voltage level generator having an output having a potential that is different from ground and that is connected to complete a current path for the control current through the heating element.

Alternatively, the common voltage level can be selected to maximize the voltage headroom for the heating element.

BRIEF DESCRIPTION OF THE DRAWINGS

The present invention is illustrated by way of example and not by limitation in the accompanying figures in which like reference numerals indicate similar elements and in which.

DETAILED DESCRIPTION OF THE INVENTION

The present invention provides the ability to control pole-tip protrusion of a write element using a control signal by keeping the write element at a constant temperature during both read and write operations so that the clearance between the pole tips and the magnetic media (i.e., the flying height of the slider) can be controlled in a linear manner for, for example, improved reading performance during a read-retry or during a cold drive start. When the drive is in a read operation (i.e., not writing), a heating element that is positioned in close proximity to a write element that is on the same slider body that has been selected for the read operation is used to keep the write element at the same temperature as when the drive is in a write operation. The heating element is powered on when the write current is gated off and the heating element is powered off when the write current is gated on.

Figure 1:
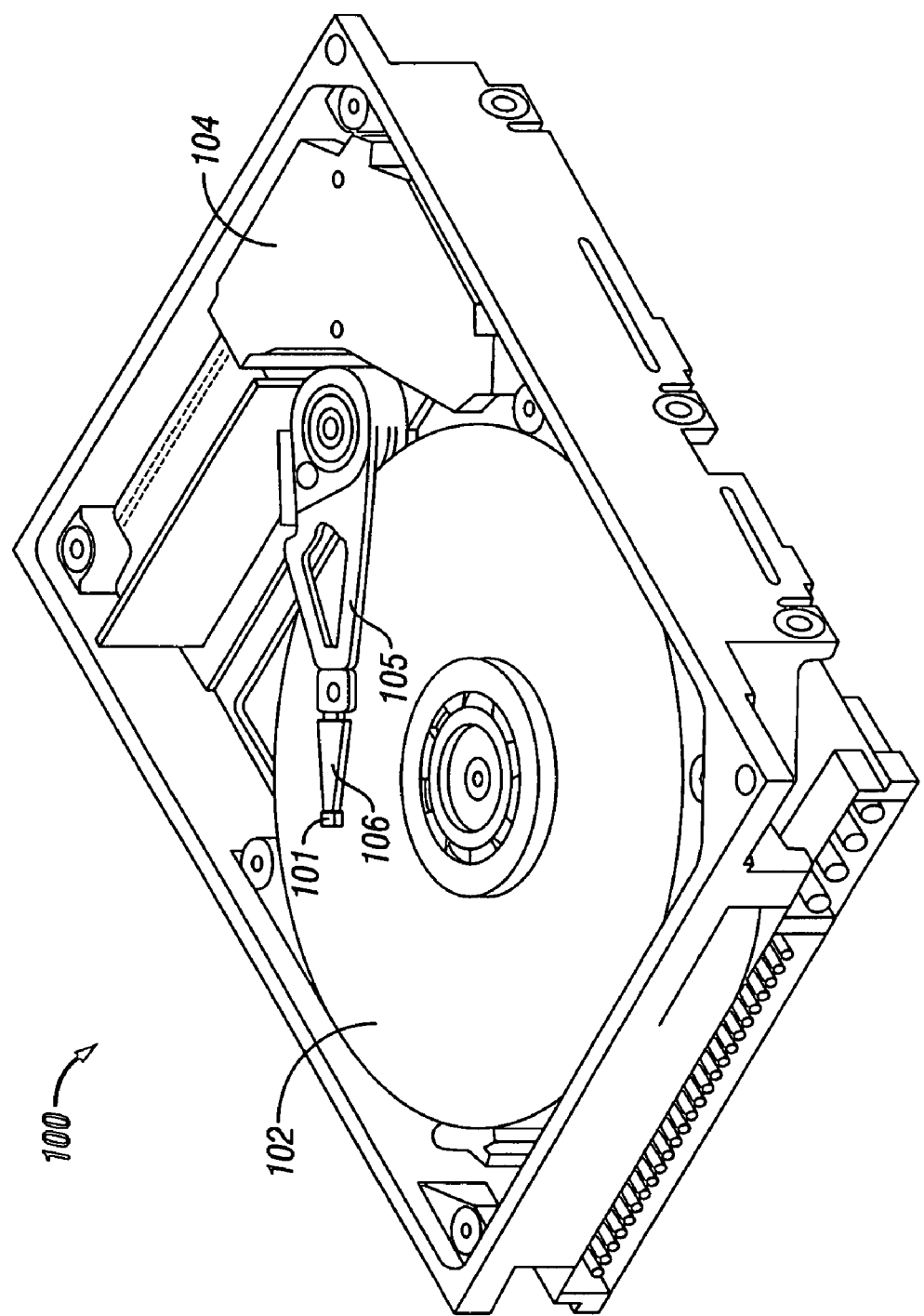
FIG. 1 shows an exemplary hard disk drive (HDD) for which the present invention is applicable.
Figure 2:
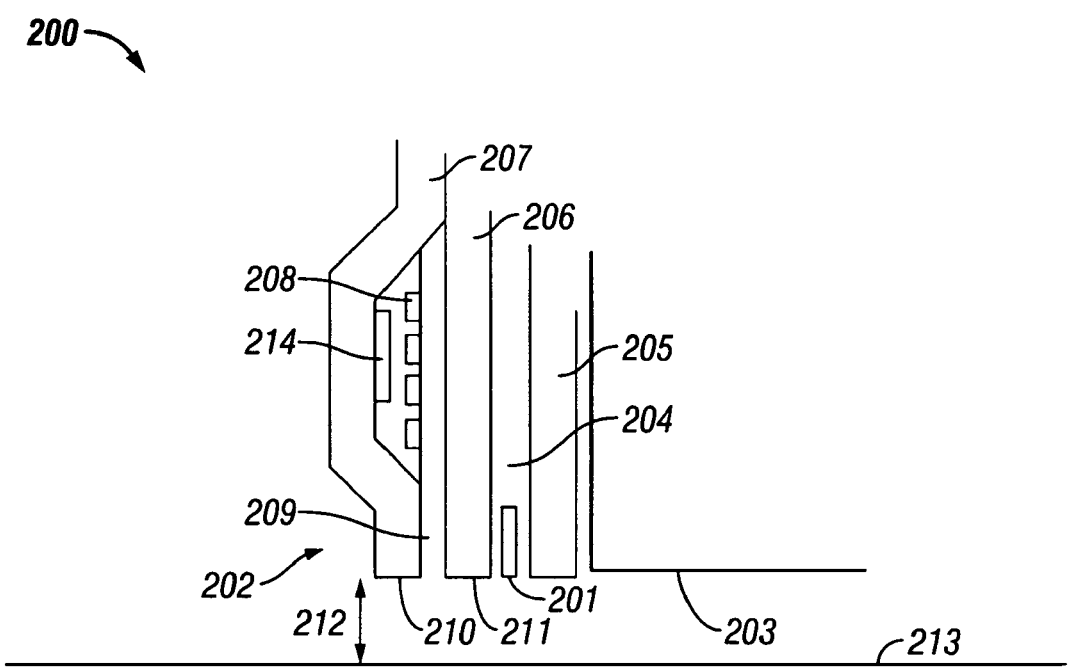
FIG. 2 depicts a cross-sectional side view of an exemplary read/write head that is part of a slider assembly.
Figure 3:
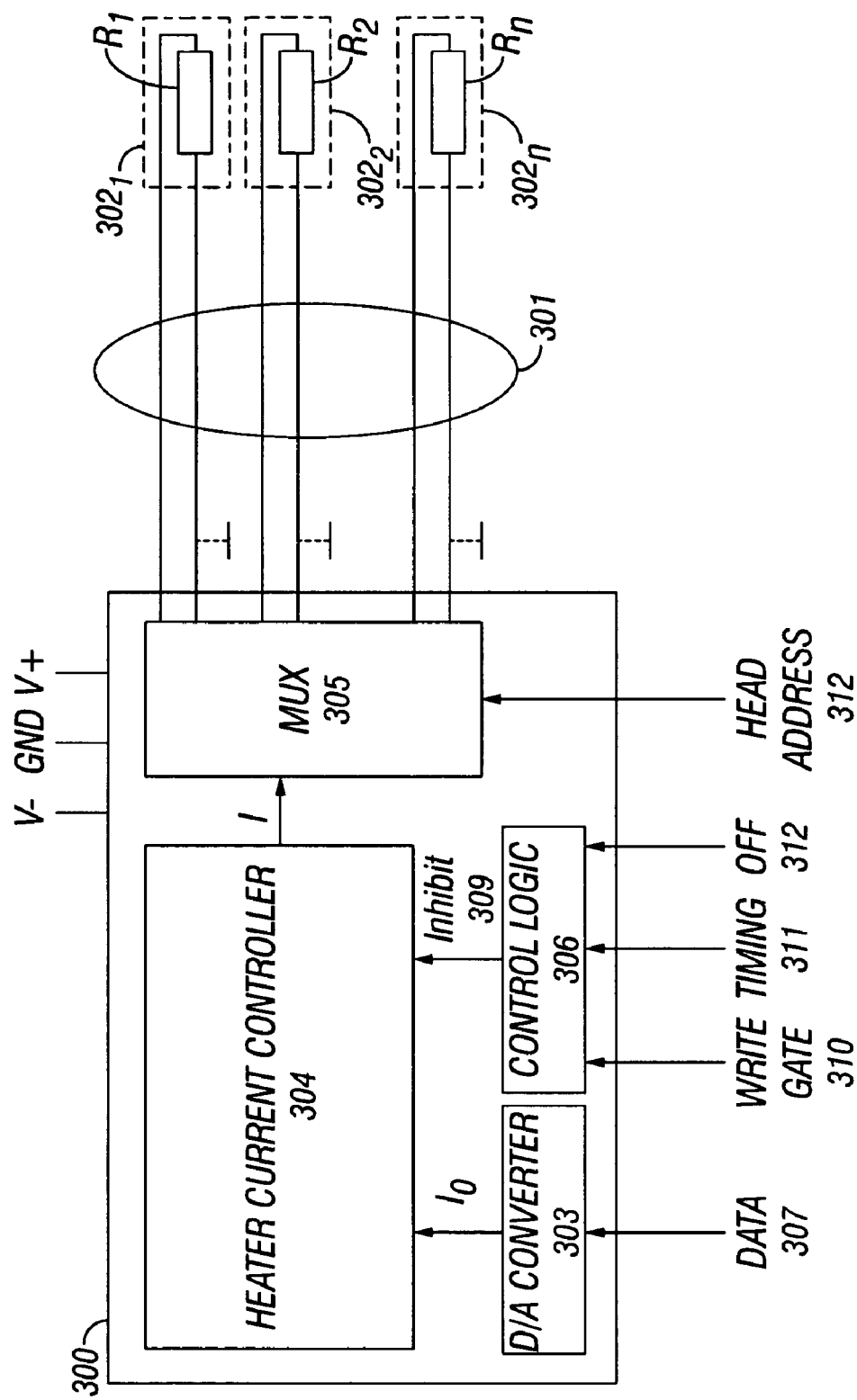
FIG. 3 depicts a functional block diagram of an exemplary embodiment of a read/write electronics module according to the present invention, a disk drive actuator arm and a plurality of slider bodies.

FIG. 3 depicts a functional block diagram of an exemplary embodiment of a read/write electronics module 300 according to the present invention, a disk drive actuator arm 301 and a plurality of slider bodies $302_1$–$302_n$. Only the functional blocks of read/write electronics module 300 relating to the present invention are shown in FIG. 3. Read/write electronics module 300, disk drive actuator arm 301 and slider bodies 302 can be used with, for example, HDD 100, shown in FIG. 1. Read/write electronics module 300 includes a conventional digital-to-analog converter (DAC) 303, a heater current controller 304, a multiplexer 305 and a control logic 306. DAC 303 receives data on data input lines 307 and, in response, outputs an analog control current $I_O$ that is input to heater current controller 304. Alternatively, DAC 303 can output a control voltage $V_0$ that is input to heater current controller 304. Heater current controller 304 generates an output current I that is selectively connected to a heater element, or resistor, $R_1$–$R_n$ (also $R_{heater}$) by multiplexer 305. Head address lines 310, which in a conventional read/write electronics module control a multiplexer to connect the module to a selected head, are similarly used by the present invention for controlling multiplexer 305 to connect output current I to a selected heater element $R_1$–$R_n$. Control logic 306 generates an Inhibit signal 309 that enables heater current controller 304 when module 300 is in a read mode and disables heater current controller 304 when module 300 is in a write mode. A Write Gate signal 310, which in a conventional electronics module is used for switching between a write and a read operation, is input to control logic 306 and is used in a similar manner. To allow early or delayed turn off with respect to write gate signal 310, a timing signal 311 can also be used by control logic 306. To completely turn the heating function off, for instance in the standby or sleep mode of the disk drive, an overriding Off signal 312 can be input to control logic 306.

Figure 4:
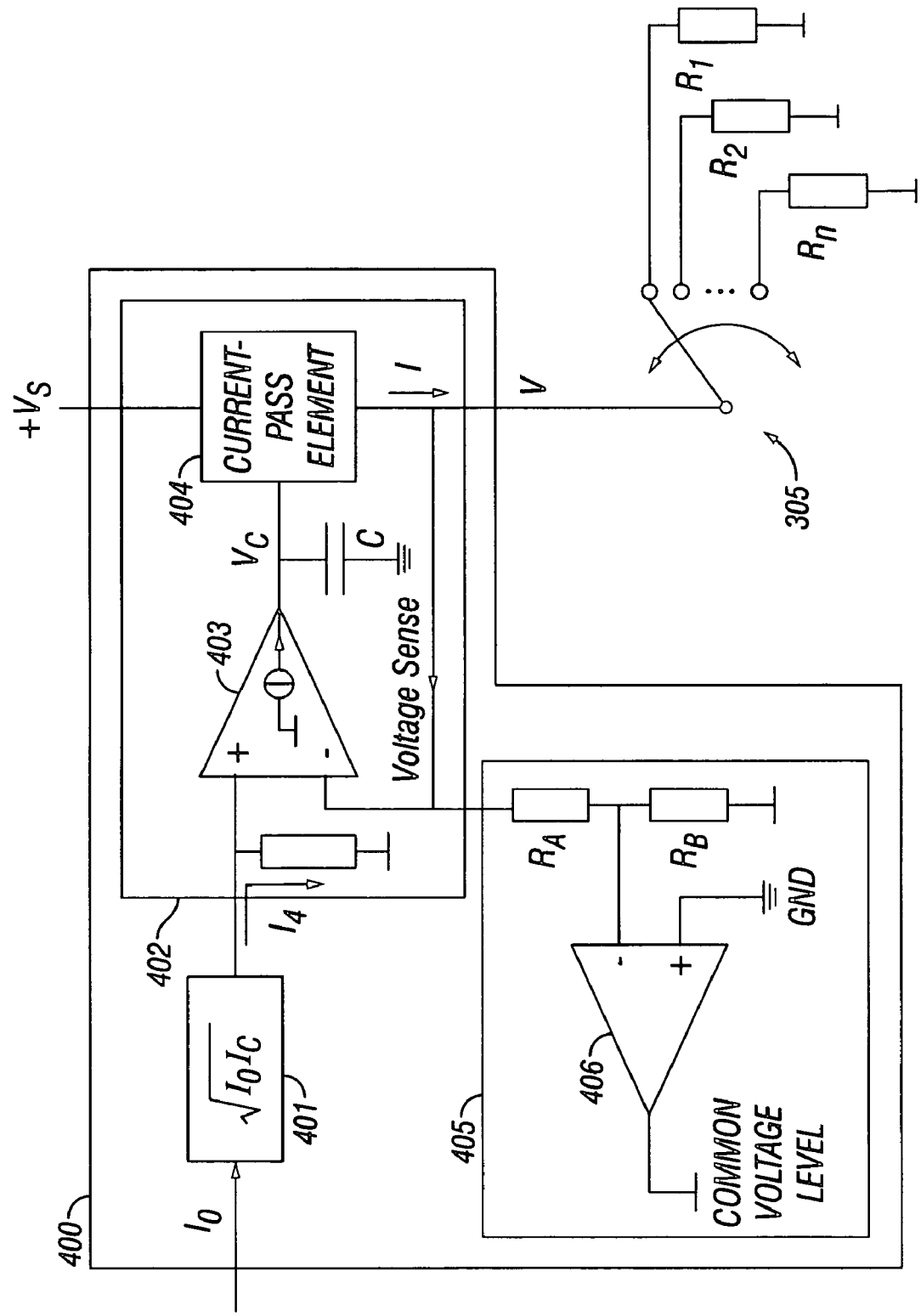
FIG. 4 shows a functional block diagram of a first exemplary embodiment of a heater current controller according to the present invention.

FIG. 4 shows a functional block diagram of a first exemplary embodiment 400 of heater current controller 304 (FIG. 3) according to the present invention. The first exemplary embodiment 400 includes a square-root circuit 401 and a current-to-voltage converter 402. Current-to-voltage converter 402 is formed by a resistor R, an operational transconductance amplifier (OTA) 403 and a current-pass element 404. The output current I of current-pass element 404 is connected to a selected heater element $R_1$–$R_n$ by multiplexer 305. For example, multiplexer 305 is shown connecting output current I to heater element $R_1$. Supply voltage $+V_S$ represents an available power supply voltage.

Square-root circuit 401 receives current $I_0$, which is output from DAC 303 (FIG. 3). Current $I_0$ corresponds to data on data lines 307. In response to current $I_0$, square-root circuit 401 outputs a current $I_4$ that is equal to the square root of the product of input current $I_0$ and a constant current $I_C$ that is defined by one or more constant current sources that are internal to square-root circuit 401. Current $I_4$ is output to current-to-voltage converter 402, which outputs a voltage V that is proportional to $I_4$. In particular, current $I_4$ passes through resistor R to the common voltage level, which is indicated by a solid horizontal bar. The non-inverting input of OTA 403 is connected to the voltage across resistor R. The output current of OTA 403 is integrated in time by a capacitor C to form a voltage $V_C$. Voltage $V_C$ drives the control terminal (i.e., a base or gate of a transistor) of current-pass element 404, such as a bipolar or FET transistor or an assembly of active elements, thereby controlling the output current I through the selected heater element. The resulting voltage V that is generated across the selected heater element is fed back to the inverting input of OTA 403 and OTA 403 forces the voltage V that is across the selected heater element to equal the voltage across resistor R. Capacitor C reduces high-frequency disturbances in output voltage V of heater current controller 304. If the disturbances were allowed to pass through to a heater element, the disturbances would be on traces of a Trace Suspension Assembly (TSA) (not shown) and could result in crosstalk to the TSA read line traces.

Thus, the output of voltage V is $$V = R\sqrt{I_0 I_C}. \tag{1}$$

The power dissipation P in a heater element $R_{heater}$ is given by $$P = R^2 I_0 I_C / R_{heater}. \tag{2}$$

The dissipation, i.e., the temperature rise in a heater element $R_{heater}$, is proportional to $I_0$. Moreover, the protrusion of the pole tips and changes in flying height are also proportional to $I_0$.

The "other side" of heater element $R_1$ is shown in FIG. 4 connected to the common voltage. The common voltage can be at ground potential or at a selected potential level that is different from ground. When the common voltage is at ground potential, the "other side" of heater element $R_1$ can be connected to the steel suspension of the HDD, which is grounded, thereby avoiding the need for a dedicated return trace on the TSA to complete the circuit through heater element $R_1$. Alternatively, the "other side" of heater element $R_1$ can be connected to ground via a dedicated return trace on the TSA.

When the common voltage is selected to be a potential that is different from ground, the "other side" of heater element $R_1$ is connected to the common voltage via a trace on the TSA to complete the circuit. The common voltage could be chosen to be at any voltage between the available positive and the negative power supply voltage, in which case the common voltage should be chosen to maximize the voltage headroom for the heater element, thereby allowing for a relatively greater heater element resistance and a relatively lower heater current for the same power dissipation in the heater element. Alternatively, a common voltage generator can be used for controlling the center voltage of a heater element to be at ground potential, such as common voltage generator 405 shown in FIG. 4. Common voltage generator 405 includes a differential amplifier 406 and two equal value resistors $R_A$ and $R_B$. The inverting input of differential amplifier 406 is connected to the center connection between resistors $R_A$ and $R_B$, which are both connected in series across the heater element. The non-inverting input of differential amplifier 406 is connected to ground. The amplified error signal of amplifier 406 keeps the potential of the center of the heater element at ground potential.

Figure 5:
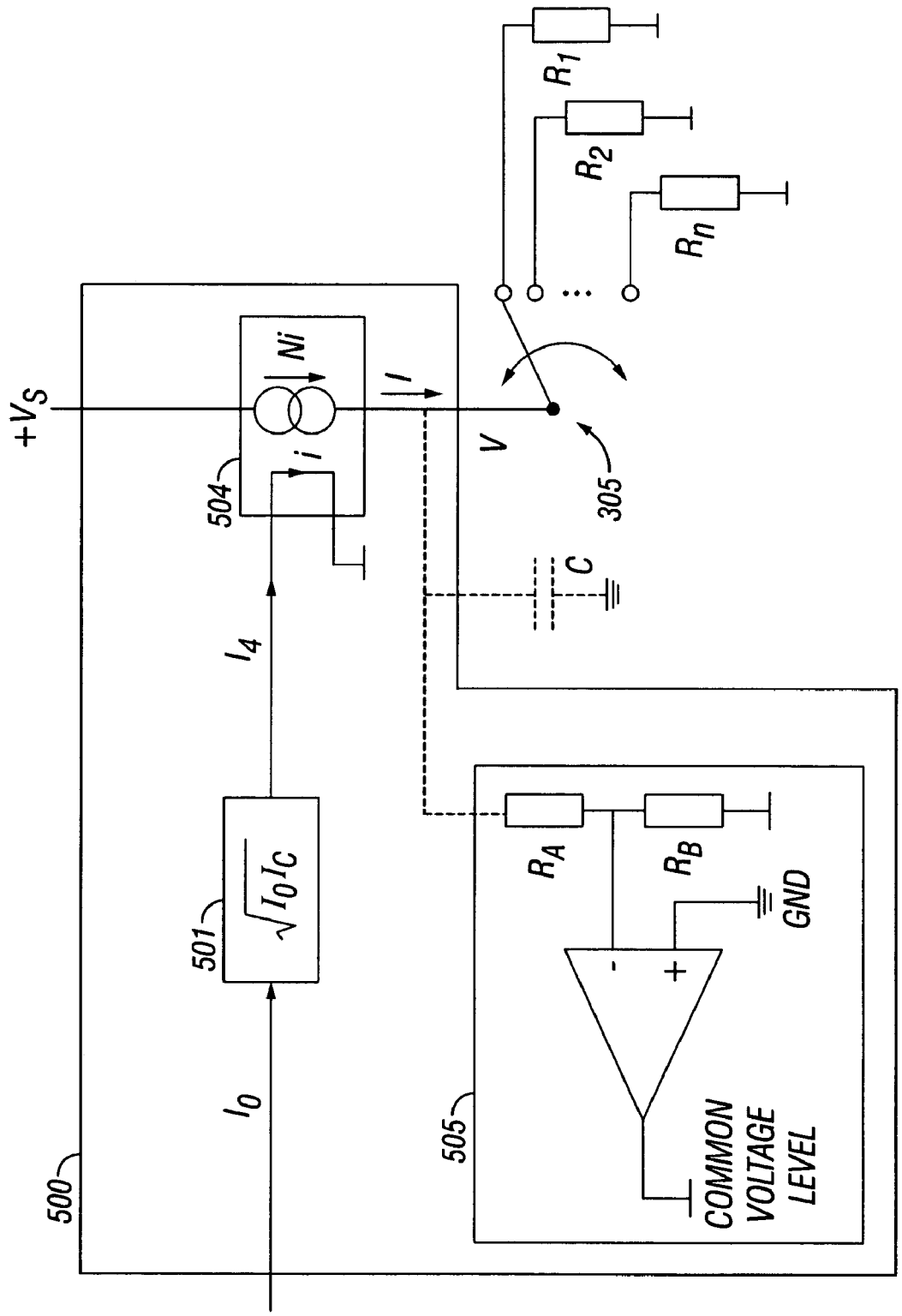
FIG. 5 shows a block diagram of a second exemplary embodiment of a heater current controller according to the present invention.

FIG. 5 shows a block diagram of a second exemplary embodiment 500 of heater current controller 304 according to the present invention. The second exemplary embodiment 500 includes a square-root circuit 501 (which is the same as square-root circuit 401 shown in FIG. 4) a current-pass element 504 and an optional common voltage generator 505 for, for example, controlling the potential of the center of a heater element to be at ground potential. Output current I of current-pass element 504 is connected to a selected heater element $R_1$–$R_n$ by multiplexer 305. For example, multiplexer 305 is shown connecting output current I to heater element $R_1$. Supply voltage +$V_S$ represents an available power supply voltage. Second exemplary embodiment 500 differs from first embodiment 400 by not having a current-to-voltage converter 402, consequently, current $I_4$ directly drives current-pass element 504. Current-pass element 504 outputs a current I that is N times larger than current $I_4$. That is, $$I = N\sqrt{I_0 I_C}; \tag{3}$$

consequently, $$P = N^2 I_0 I_C R_{heater}. \tag{4}$$

As with first exemplary embodiment 400 of heater current controller 304, the power dissipation and the flying height associated with the second exemplary embodiment 500 are proportional to $I_0$. Filtering can be performed by a capacitor C that is connected to the output of current-pass element 504. The optional nature of capacitor C is depicted by capacitor C and a connection to the output of second exemplary embodiment 500 using dotted lines. Additionally, common voltage generator 505 is indicated to be an optional feature of exemplary embodiment 500 by a dotted line shown connection common voltage generator 505 to the output of current-pass element 504.

Figure 6B:
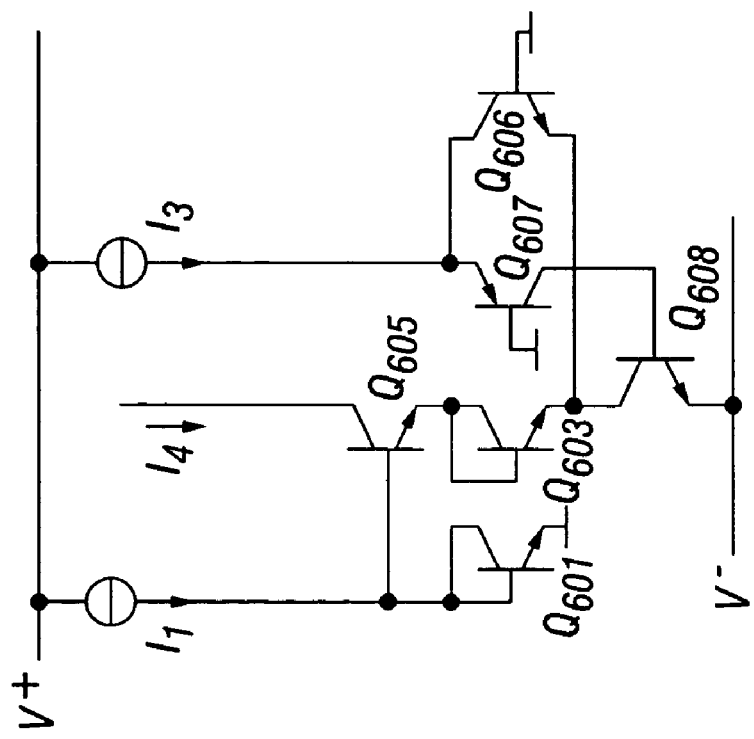
FIGS. 6A and 6B respectively show two exemplary embodiments of square-root circuits that are suitable for the present invention.
Figure 6A:
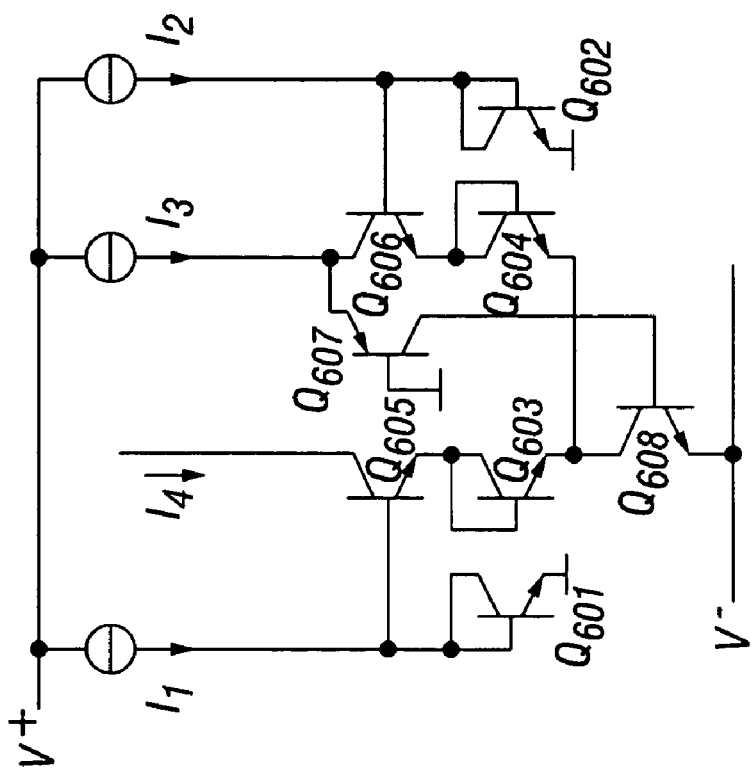

FIGS. 6A and 6B respectively show two exemplary embodiments 600 and 650 that are suitable for both square-root circuits 401 and 501. In each exemplary embodiment 600 and 650, transistors $Q_{601}$, $Q_{602}$, $Q_{603}$, $Q_{604}$, $Q_{605}$ and $Q_{606}$ are matched npn transistors. The first embodiment 600 of a square-root circuit, shown in FIG. 6A, has three input currents $I_1$, $I_2$ and $I_3$, and one output current $I_4$. The current output from current source $I_1$, flows through transistor $Q_{601}$, which is connected as a diode, as $$I_1 = I_S e^{(V_{601}/V_T)}, \tag{5}$$

in which $V_{601}$, is the base-to-emitter voltage of transistor $Q_{601}$, $I_S$ is the saturation current of the matched npn transistors (in this case, the saturation current of transistor $Q_{601}$), $V_T = kT/q$, q is the charge of an electron, k is Boltzman's constant and T is the absolute temperature.

Similarly, the current output from current source $I_2$ flows through transistor $Q_{602}$ (also connected as a diode) as $$I_2 = I_S e^{(V_{602}/V_T)}, \tag{6}$$

in which $V_{602}$ is the base-to-emitter voltage of transistor $Q_{602}$ and $I_S$ is the saturation current of the matched npn transistors (in this case, the saturation current of transistor $Q_{602}$). Current $I_3$ is forced by the feedback path through transistor $Q_{607}$ to the base of tail current transistor $Q_{608}$ to flow entirely through transistors $Q_{606}$ and $Q_{604}$. Accordingly, $$I_3 = I_S e^{(V_{606}/V_T)} = I_S e^{(V_{604}/V_T)}. \tag{7}$$

Assuming a current $I_4$ that flows through transistors $Q_{603}$ and $Q_{605}$, it follows that $$I_4 = I_S e^{(V_{603}/V_T)} = I_S e^{(V_{605}/V_T)}. \tag{8}$$

The following equality also holds for the first exemplary embodiment 600 of a square-root circuit:

$$V_{601} - V_{605} - V_{603} + V_{604} + V_{606} - V_{602} = 0. \tag{9}$$

By substituting Eqs. 5–8 into Eq. 9:

$$I_1 I_3^2 / I_4^2 I_2 = 1. \tag{10}$$

After algebraic manipulation of Eq. 10, it is found that $$I_4 = I_3 \sqrt{(I_1/I_2)}. \quad (11)$$

By defining current source $I_1$ of the first embodiment 600 of a square-root circuit to be the input current $I_0$ for heater current controller 304 (FIG. 3), then $$I_0 = I_1 \quad (12)$$

and $$I_C = I_3^2/I_2. \quad (13)$$

The second exemplary embodiment 650 of a square-root circuit, shown in FIG. 6B, is a simplified version of first exemplary embodiment 600 (FIG. 6A). For the second exemplary embodiment 650, $$V_{601} - V_{605} - V_{603} + V_{606} = 0, \quad (14)$$

$$I_1 I_3/I_4^2 = 1, \quad (15)$$

and $$I_4 = \sqrt{I_1 I_3}. \quad (16)$$

Again, if current source $I_1$ is defined to be the input current $I_0$ for the heater current controller, then $$I_0 = I_1 \quad (17)$$

and $$I_C = I_3. \quad (18)$$

Figure 7A:
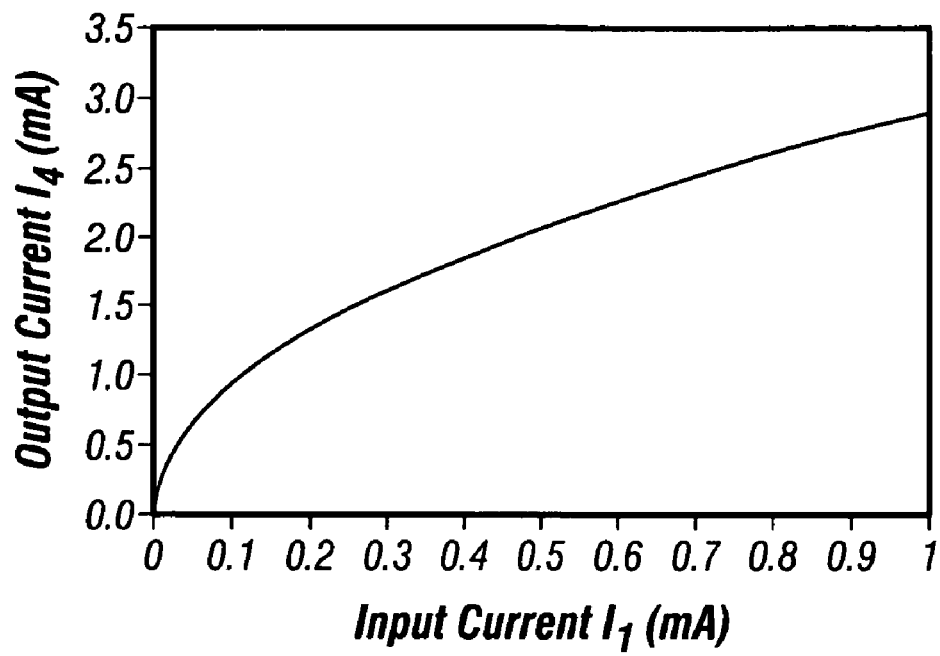
FIGS. 7A and 7B respectively show graphs of PSpice simulations for output current I and $I^2$ as a function of input current $I_1$ when $I_3=I_C=8$ mA for the second exemplary embodiment of a square-root circuit shown in FIG. 6B.
Figure 7B:
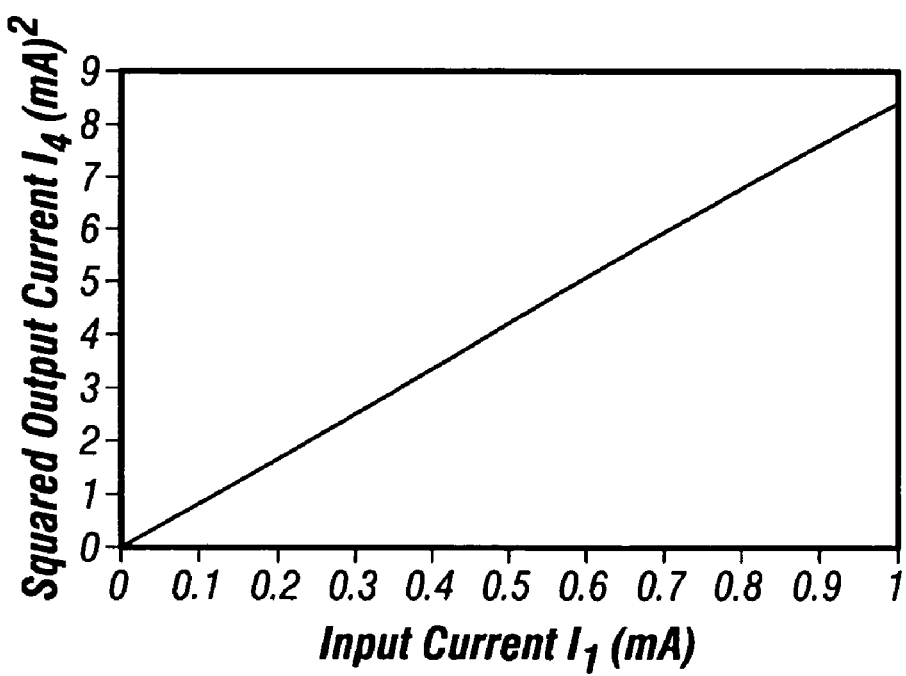

FIGS. 7A and 7B respectively show graphs of PSpice simulations for output current I and $I^2$ as a function of input current $I_1$ for the second exemplary embodiment of a square-root circuit shown in FIG. 6B when $I_3 = I_C = 8$ mA. The output power P associated with $I_4$ (per Ohm of heater element) can be read directly from the graph of FIG. 7B. The decrease in flying height of the slider is proportional to the output power and, as such, the decrease in flying height follows the curve of FIG. 7B. Thus, the decrease in flying height is linear with control current $I_1$.

Figure 8:
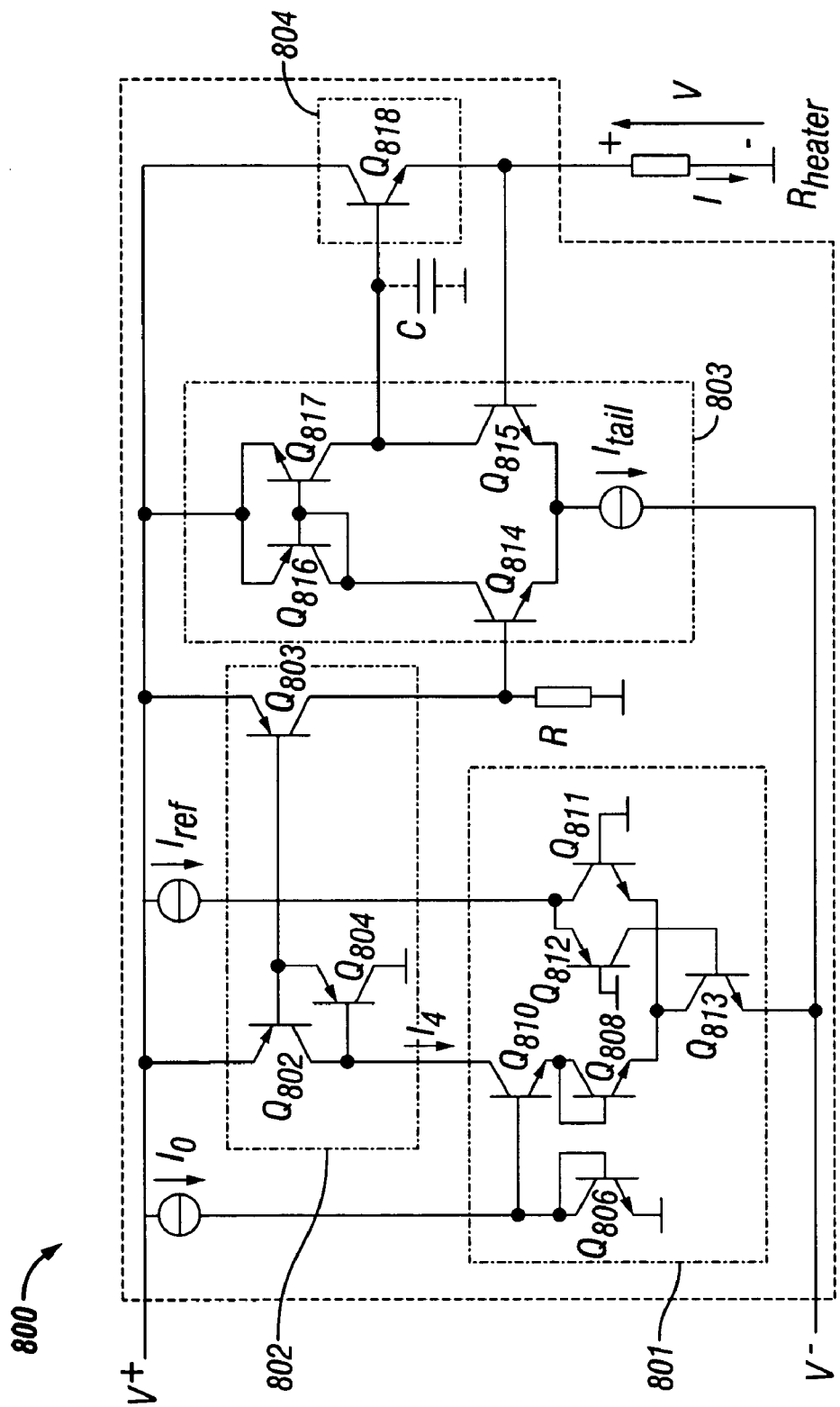
FIG. 8 shows a third exemplary embodiment of a heater current controller according to the present invention that is based on the block diagram of FIG. 4 and the exemplary embodiment of a square-root circuit shown in FIG. 6B.

FIG. 8 shows a third exemplary embodiment 800 of a heater current controller according to the present invention that is based on the block diagram of FIG. 4 and exemplary embodiment 650 of a square-root circuit shown in FIG. 6B. It should be understood that exemplary embodiment 600 for a square-root circuit could alternatively be used. For the exemplary embodiment 800, $I_{ref} = I_C$ and current $I_0$ is the input current that linearly controls the heater power dissipation and the flying height decrease. Embodiment 800 includes a square-root circuit 801, a first current mirror 802, an OTA 803 and a current-pass element 804. Output current $I_4$ of square-root circuit 801 is input to a current-to-voltage-converting resistor R via first current mirror 802. First current mirror 802 is formed by transistors $Q_{802}$, $Q_{803}$ and $Q_{804}$. OTA 803 is formed by differential transistor pair $Q_{814}$–$Q_{815}$ with tail current $I_{tail}$ and a second current mirror that is formed by transistors $Q_{816}$–$Q_{817}$. The base of transistor $Q_{814}$ is the non-inverting input of OTA 803 and the base of transistor $Q_{815}$ is the inverting input of OTA 803. The current at the output of OTA 803 is integrated by a capacitor C that effectively suppresses any high frequency disturbances that would otherwise appear in the drive voltage V for a heater element $R_{heater}$ and would thereby cause crosstalk to the read line traces on the TSA (not shown in FIG. 8). The disturbances can, for instance, be the result of a limited power supply rejection, which can cause the interference on the power supply voltage appear at various nodes internal to embodiment 800. Power supply rejection can be significantly increased by using current mirrors for the first and second current mirrors having an improved power supply rejection. The (filtered) voltage across capacitor C drives emitter follower transistor $Q_{818}$ of current-pass element 805. The output voltage of the emitter follower is fed back to the inverting input of OTA 803, which results in an emitter follower output voltage V that is equal to the voltage across resistor R with the high frequency interference removed. Thus, $$V = R\sqrt{I_0 I_{ref}}. \quad (19)$$

Figure 9:
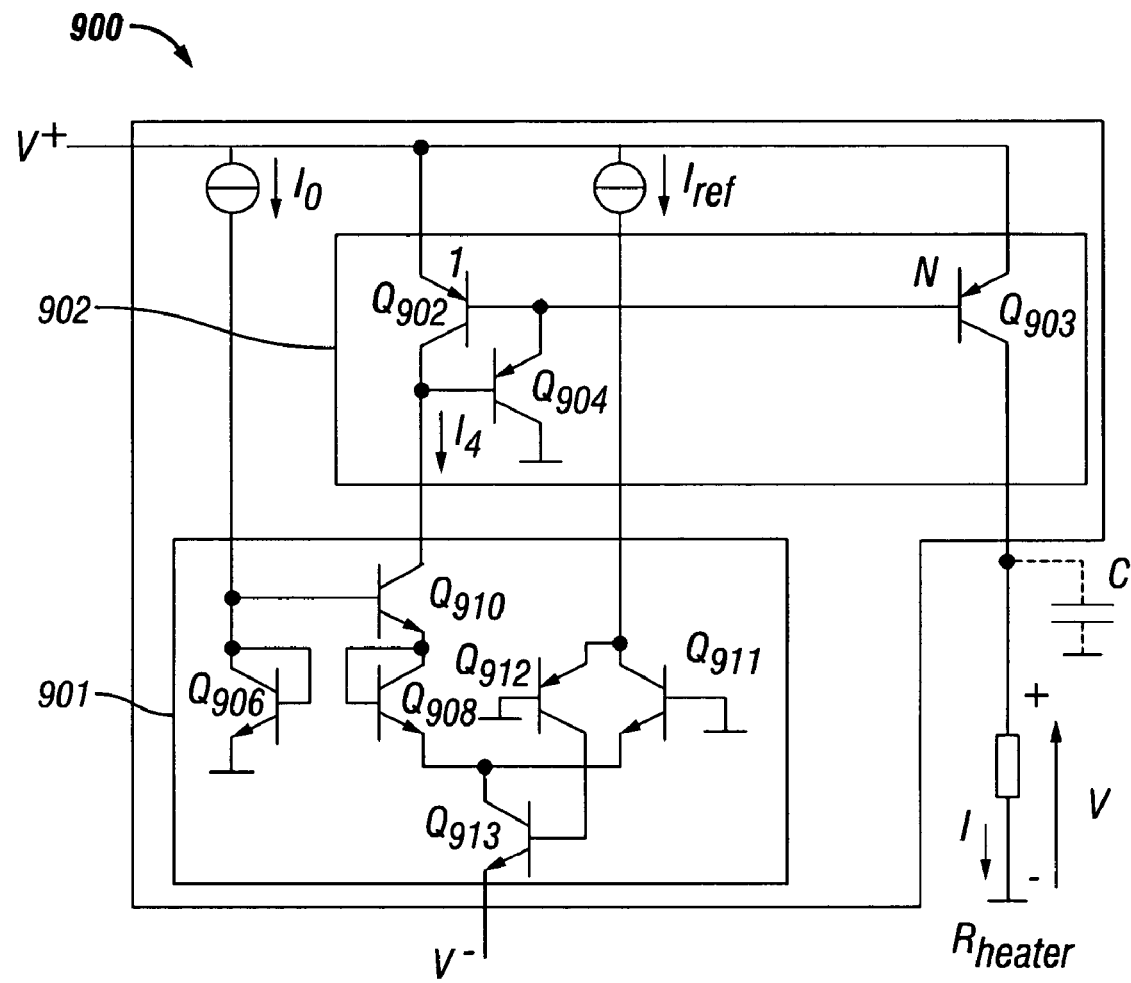
FIG. 9 shows a fourth exemplary embodiment of a heater current controller according to the present invention that is based on the block diagram of FIG. 5 and the exemplary embodiment of a square-root circuit shown in FIG. 6B.

FIG. 9 shows a fourth exemplary embodiment 900 of a heater current controller according to the present invention that is based on the block diagram of FIG. 5 and exemplary embodiment 650 for a square-root circuit shown in FIG. 6B. It should be understood that exemplary embodiment 600 of a square-root circuit could alternatively be used. Embodiment 900 includes a square-root circuit 901 and a current mirror 902, which is formed by transistors $Q_{902}$, $Q_{903}$ and $Q_{904}$. The aspect ratio of transistors $Q_{903}$ and $Q_{902}$ equals N. Current $I_4$, which is output from square-root circuit 901, drives current mirror 902. Output I from current mirror 902 is N times larger than input current $I_4$. That is, $$I = NI_4 = N\sqrt{I_0 I_{ref}} \quad (20)$$

The power dissipation P in a heater element $R_{heater}$ is $$P = N^2 R_{heater} I_{ref} I_0. \quad (21)$$

The power dissipation and a decrease in flying height are proportional to control current $I_0$. An optional filter capacitor C, shown connected to the output of second exemplary embodiment 900 with a dotted line, can be used for reducing high frequency disturbance in heater voltage V. Filter capacitor C can be optionally placed at the output of embodiment 900 when embodiment 900 is an integrated circuit. Again, to increase the power supply rejection, an improved current mirror circuit having an improved power supply rejection can be employed.

Although the foregoing invention has been described in some detail for purposes of clarity of understanding, it will be apparent that certain changes and modifications may be practiced that are within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A slider flying-height controller for a hard disk drive, the controller comprising:
    a heater current controller including a square-root circuit that receives an input current and generates a first current that is proportional to the square root of the input current, the heater current controller outputting a control current that is proportional to the first current generated by the square root circuit in response to the input current; and
    a multiplexer coupling the control current to a heating element associated with a write element on a selected slider body of the hard disk drive when the hard disk drive is in a read operation, the heating element dissipating a power that is proportional to the input current and causing a spacing decrease between pole tips of the write element and a magnetic medium that is associated with the write element that is proportional to the input current.

2. The controller according to claim 1, wherein the first current is proportional to the square root of the product of the input current and a second current having a predetermined magnitude.

3. The controller according to claim 1, wherein the heater current controller further includes a current-pass element coupled to the first current and outputting the control current.

4. The controller according to claim 3, further comprising a low-pass filter coupled to the output of the heater current controller that reduces high frequency disturbances in the output of the heater current controller.

5. The controller according to claim 3, wherein the heater current controller further includes a current-to-voltage converter that receives the first current and produces a voltage that is coupled to the current-pass element, and wherein the control current output from the current-pass element generates a voltage across the heater element that is proportional to the first current.

6. The controller according to claim 5, wherein current-to-voltage converter includes:
a resistor through which the first current passes and generates a first voltage; and
an operational transconductance amplifier that receives the first voltage and outputs a third current that drives the current-pass element.

7. The controller according to claim 6, wherein the current-to-voltage converter includes a low-pass filter coupled to the output of the operational transconductance amplifier that reduces high frequency disturbances in the output of the operational transconductance amplifier.

8. The controller according to claim 1, wherein the input current is generated by a digital-to-analog converter based on selected data input to the digital-to-analog converter.

9. The controller according to claim 1, further comprising a common voltage level generator having an output that is connected to complete a current path for the control current through the heating element.

10. The controller according to claim 9, wherein the common voltage level is a potential that is different from ground.

11. The controller according to claim 9, wherein the common voltage level is selected to maximize a voltage headroom for the heating element.

12. The controller according to claim 1, wherein the controller is part of a read/write electronics module for the hard disk drive.

13. A hard disk drive, comprising:
a plurality of slider bodies, each slider body including at least one read element and at least one write element; and
a read/write electronics module including:
a heater current controller including a square-root circuit that receives an input current and generates a first current that is proportional to the square root of the input current, the heater current controller outputting a control current that is proportional to the first current generated by the square root circuit in response to the input current; and
a multiplexer coupling the control current to a heating element associated with a write element on a selected slider body when the hard disk drive is in a read operation, the heating element dissipating a power that is proportional to the input current and causing a spacing decrease between pole tips of the write element and a magnetic medium that is associated with the write element that is proportional to the input current.

14. The hard disk drive according to claim 13, wherein the first current is proportional to the square root of the product of the input current and a second current having a predetermined magnitude.

15. The hard disk drive according to claim 13, wherein the heater current controller further includes a current-pass element coupled to the first current and outputting the control current.

16. The hard disk drive according to claim 15, further comprising a low-pass filter coupled to the output of the heater current controller that reduces high frequency disturbances in the output of the heater current controller.

17. The hard disk drive according to claim 15, wherein the heater current controller further includes a current-to-voltage converter that receives the first current and produces a voltage that is coupled to the current-pass element, and
wherein the control current output from the current-pass element generates a voltage across the heater element that is proportional to the first current.

18. The hard disk drive according to claim 17, wherein current-to-voltage converter includes:
a resistor through which the first current passes and generates a first voltage; and
an operational transconductance amplifier that receives the first voltage and outputs a third current that drives the current-pass element.

19. The hard disk drive according to claim 18, wherein the current-to-voltage converter includes a low-pass filter coupled to the output of the operational transconductance amplifier that reduces high frequency disturbances in the output of the operational transconductance amplifier.

20. The hard disk drive according to claim 13, wherein the input current is generated by a digital-to-analog converter based on selected data input to the digital-to-analog converter.

21. The hard disk drive according claim 13, wherein the read/write electronics module further includes a common voltage level generator having an output that is connected to complete a current path for the control current through the heating element.

22. The hard disk drive according to claim 21, wherein the common voltage level is a potential that is different from ground.

23. The hard disk drive according to claim 21, wherein the common voltage level is selected to maximize a voltage headroom for the heating element.

* * * * *

UNITED STATES PATENT AND TRADEMARK OFFICE
CERTIFICATE OF CORRECTION

PATENT NO. : 7,061,706 B2
APPLICATION NO. : 10/800931
DATED : June 13, 2006
INVENTOR(S) : John Thomas Contreras et al.

It is certified that error appears in the above-identified patent and that said Letters Patent is hereby corrected as shown below:

Title page,
Item [75], Inventors, change "John Thomas Conteras" to --John Thomas Contreras--.

Signed and Sealed this

Third Day of October, 2006

JON W. DUDAS
*Director of the United States Patent and Trademark Office*